US012356168B2

(12) United States Patent
O'Brien et al.

(10) Patent No.: US 12,356,168 B2
(45) Date of Patent: Jul. 8, 2025

(54) LOUDSPEAKER CONE WITH RAISED CURVED PROTRUSIONS AND METHODS FOR CONTROLLING RESONANT MODES

(71) Applicant: Polk Audio LLC, Carlsbad, CA (US)

(72) Inventors: Sean O'Brien, Harwood, MD (US); Stuart W. Lumsden, Baltimiore, MD (US)

(73) Assignee: Polk Audio, LLC, Vista, CA (US)

( * ) Notice: Subject to any disclaimer, the term of this patent is extended or adjusted under 35 U.S.C. 154(b) by 0 days.

(21) Appl. No.: 18/629,642

(22) Filed: Apr. 8, 2024

(65) Prior Publication Data

US 2024/0381029 A1 Nov. 14, 2024

Related U.S. Application Data

(63) Continuation of application No. 17/631,358, filed as application No. PCT/US2020/044078 on Jul. 29, 2020, now Pat. No. 11,974,111.

(60) Provisional application No. 62/879,889, filed on Jul. 29, 2019.

(51) Int. Cl.
*H04R 7/12* (2006.01)
*H04R 7/26* (2006.01)
*H04R 31/00* (2006.01)

(52) U.S. Cl.
CPC ............... *H04R 7/125* (2013.01); *H04R 7/26* (2013.01); *H04R 31/003* (2013.01)

(58) Field of Classification Search
CPC ......... H04R 7/125; H04R 7/26; H04R 31/003
See application file for complete search history.

(56) References Cited

U.S. PATENT DOCUMENTS

| | | | |
|---|---|---|---|
| 1,807,225 A | 5/1931 | Pack |
| 3,464,514 A | 9/1969 | Mochida et al. |
| 4,413,162 A | 11/1983 | Lumsden et al. |

(Continued)

FOREIGN PATENT DOCUMENTS

| | | |
|---|---|---|
| EP | 1091616 A1 | 4/2001 |
| EP | 10916161 | 4/2001 |

(Continued)

OTHER PUBLICATIONS

International Preliminary Report on Patentability for PCT/US2020/044078 dated Feb. 1, 2022, pp. 1-7.

(Continued)

*Primary Examiner* — Sunita Joshi
(74) *Attorney, Agent, or Firm* — Knobbe, Martens, Olson & Bear, LLP

(57) ABSTRACT

A loudspeaker transducer diaphragm or cone (e.g., 201, 301 or 401) is configured with arcuate protrusions that project distally from the main forward or distal surface 230 to provide stiffening and a break-up of resonant vibration modes when the loudspeaker is in use. The protrusions (e.g., 210, 310 or 410) are convex on one surface 230 and concave on the opposite surface 234, so their average thickness is similar to the frustoconical areas of the cone, i.e. they are shell-like in nature rather than solid mounds or walls. The protrusions 210 are generally curved as they run radially from the inner opening 204 to the outer peripheral edge to encourage modal break-up (suppressing strong vibrational modes, e.g., as in region 155).

6 Claims, 11 Drawing Sheets

(56) References Cited

U.S. PATENT DOCUMENTS

| | | | | | |
|---|---|---|---|---|---|
| 4,517,416 | A * | 5/1985 | Goossens | H04R 7/10 181/146 |
| 6,320,972 | B1 | 11/2001 | Goller | |
| 6,863,153 | B1 | 3/2005 | Hayakawa et al. | |
| 7,684,582 | B2 | 3/2010 | Gladwin et al. | |
| 8,131,001 | B2 | 3/2012 | Toyofuku et al. | |
| 8,638,968 | B2 | 1/2014 | Gladwin | |
| 9,282,410 | B2 | 3/2016 | Gladwin et al. | |
| 9,538,268 | B2 | 1/2017 | Gladwin et al. | |
| 2004/0195039 | A1 | 10/2004 | Sahyoun | |
| 2005/0006805 | A1 | 1/2005 | Suginara et al. | |
| 2007/0209866 | A1 | 9/2007 | Frasl et al. | |
| 2009/0028376 | A1 | 1/2009 | Saito et al. | |
| 2009/0041291 | A1 | 2/2009 | Toyofuku et al. | |
| 2011/0129113 | A1 | 6/2011 | Kumakura et al. | |
| 2013/0233640 | A1 | 9/2013 | Humphreys et al. | |
| 2018/0317015 | A1 | 11/2018 | Bellas et al. | |
| 2018/0324529 | A1 | 11/2018 | Kahfizadeh | |
| 2022/0150618 | A1 | 5/2022 | O'Brien, Sr. | |
| 2022/0329946 | A1 | 10/2022 | O'Brien et al. | |

FOREIGN PATENT DOCUMENTS

| | | | | | |
|---|---|---|---|---|---|
| EP | 3166333 | A1 * | 5/2017 | H04R 7/02 |
| JP | 3135482 | B2 | 2/2001 | |
| JP | 2010-278793 | | 9/2010 | |
| JP | 5327170 | B2 | 10/2013 | |
| WO | WO-2007032461 | A1 * | 3/2007 | H04R 9/06 |

OTHER PUBLICATIONS

International Search Report for PCT/US2020/044078 dated Nov. 9, 2020, pp. 1-2.

European Supplemental Search Report and Examination for EP20200845882 dated Jul. 3, 2023, pp. 1-8.

* cited by examiner

FIG. 3B
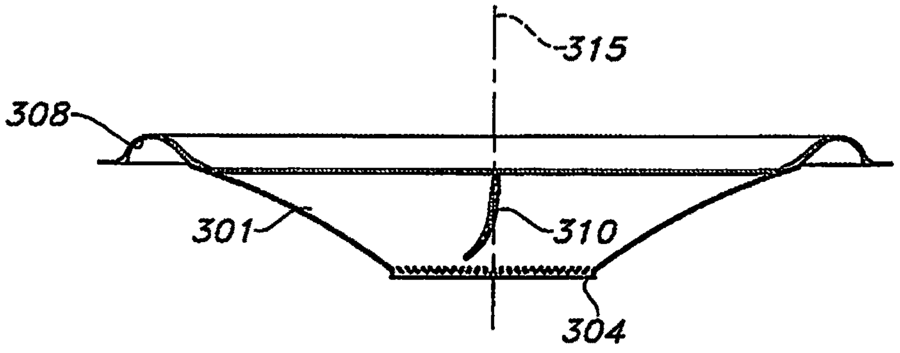
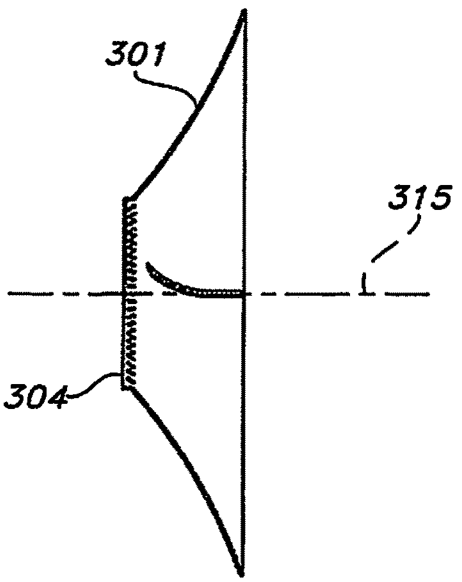
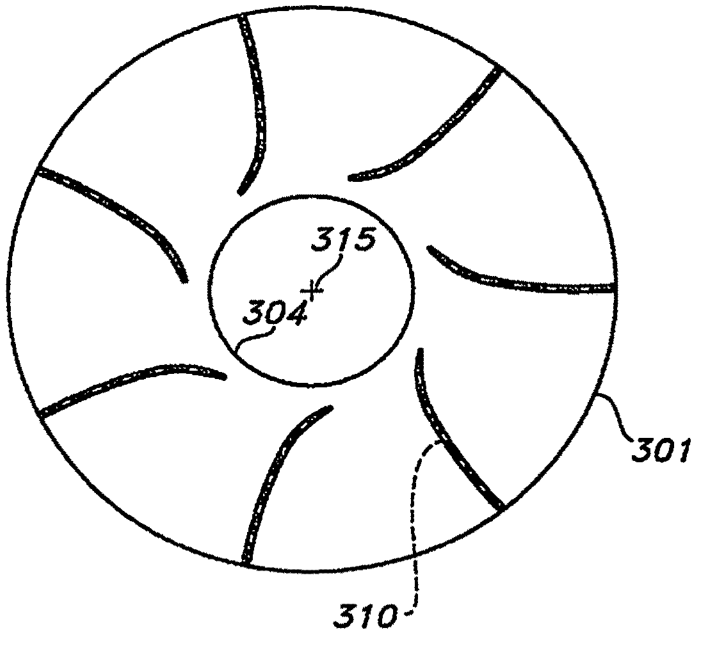
FIG. 3C
FIG. 3A

Improvements in Frequency Response for broad protrusion cone (B) vs standard cone (A)

LOUDSPEAKER CONE WITH RAISED CURVED PROTRUSIONS AND METHODS FOR CONTROLLING RESONANT MODES

PRIORITY CLAIM AND REFERENCE TO RELATED APPLICATIONS

This application is a continuation of U.S. application Ser. No. 17/631,358 filed Jan. 18, 2022, which is a 371 International application of PCT/US2020/044078 filed Jul. 29, 2020, which claims the benefit of priority to related, commonly-owned U.S. Provisional Application No. 62/879,889 filed Jul. 29, 2019, the entire disclosures of which are incorporated herein by reference and priority to each of which is claimed. This application is also broadly related to commonly owned U.S. Pat. Nos. 7,684,582 and 9,538,268, the entire disclosures of which are also incorporated herein by reference.

BACKGROUND OF THE INVENTION

Field of the Invention

The present invention relates to loudspeaker transducer diaphragms.

Discussion of the Prior Art

In a typical audio transducer, sound is generated by an electro-dynamically driven diaphragm or cone which reciprocates along an axis while supported in a suspension providing a mechanical restoring force to the diaphragm or cone body.

A typical prior art or conventional electrodynamic loudspeaker driver (e.g., 100) is shown in FIG. 1 and some nomenclature used by those having skill in the art will be reviewed, to provide background and context for the present invention. Referring to FIG. 1, a cylindrical voice coil bobbin 103 has a conductive voice coil 102 wound around its outer circumferential wall and is affixed to the center of a frusto-conical diaphragm or cone 101. The diaphragm 101 and the voice coil bobbin 103 are fixed to an inner peripheral edge of an annular or ring-shaped surround or edge 108 and to an annular damper or "spider" 109 having a selected compliance and stiffness. The outer peripheral ends of the surround 108 and the spider 109 are fixed to a rigid supportive frame or basket 112 that also carries a three-piece magnetic circuit (not shown), so that the frame 112 supports the diaphragm 101 and voice coil bobbin 103, which are pistonically movable within the frame along the central axis 115 of bobbin 103. A centered "dust" cap 113 is fixed on the diaphragm 101 to cover the hole at the center of the diaphragm 101 and moves integrally with the diaphragm 101.

The edge 108 and damper 109 support the voice coil 102 and voice coil bobbin 103 at respective predetermined positions in a magnetic gap of the magnetic circuit, which is constituted of a magnet (not shown), a plate or washer (not shown), a pole yoke (not shown) including a central, axially symmetrical pole piece (not shown). With this structure, the diaphragm or cone 101 is elastically supported without contacting the magnetic circuit and can vibrate like a piston in the axial direction within a predetermined amplitude range.

The first and second ends or leads of the voice coil 102 are connected to the respective ends of first and second conductive lead wires (not shown) which are also connected to first and second terminals (not shown) carried on frame 112. When an alternating electric current corresponding to a desired acoustic signal is supplied at the terminals to voice coil 102 through the lead wires, the voice coil 102 responds to a corresponding electro-motive force and so is driven axially in the magnetic gap of the magnetic circuit along the piston vibration direction of the diaphragm 101. As a result, the diaphragm or cone 101 vibrates together with the voice coil 102 and voice coil bobbin 103, and converts the electric signals to acoustic energy, thereby producing acoustic waves such as music or other sounds.

Returning to first principles, the function of a loudspeaker or transducer (e.g., 100) is to convert electrical energy to an analogous acoustical energy. This conversion process takes place in two steps. The first step is the conversion from electrical energy to mechanical energy. The second step is a conversion from mechanical energy to acoustical energy. The first step consists of generating a mechanical displacement proportional to the electrical input signal. The second step consists of coupling the mechanical displacement of the system to the surrounding air via some mechanism, such as forced movement of diaphragm or cone 101. The class of loudspeakers known as electro-dynamic employs a combination of permanent magnet (not shown) and electro-magnet to produce the conversion of electrical to mechanical (or sound) energy.

Transducers with ordinary cones (e.g., 100, as illustrated in FIG. 1A) suffer from a condition known as "cone break-up" which occurs when the cone body (101) behaves non-pistonically, whereby the cone body starts flexing and bending instead of all portions moving axially in the same direction at the same time (see, e.g., region 155, as illustrated in FIG. 1B). This behavior happens at certain frequencies dictated by the specific design of the cone 101 and surround 108, and the cone's resonances or resonant modes lead to distortion and deviations from a flat frequency response. In more general terms, transducer cones (e.g., 101) generate the sound a transducer is designed to produce when they are driven by the motor. These cones need to be low in mass in order to be efficient, which means that in general they are thin. Because they are being driven over a wide range of frequencies (or bandwidth), they will inevitably be driven at frequencies that correspond to resonant modes of the cone. Driving a cone at a resonant mode can cause a deviation from an even, smooth frequency response. One method of reducing the effect of such modes is to stiffen the cone so that the modes occur at higher frequencies (e.g., beyond the passband of the transducer). Creating a stiffer cone brings other tuning problems since stiffer structures may be heavier. Stiffer cones may also be created with expensive laminated structures made from exotic materials, but such transducer structures may not be commercially or economically reasonable in a desired loudspeaker system application.

There is a need, therefore, for a more effective and yet economically reasonable structure and method to provide more control over a diaphragm (e.g., cone) body's behavior and avoid problems in the driver's frequency response.

OBJECTS AND SUMMARY OF THE INVENTION

Accordingly, it is an object of the present invention to overcome the above mentioned difficulties by providing a more effective and yet economical structure and method to provide more control over a diaphragm (e.g., cone) body's behavior and avoid problems in the driver's acoustic frequency response.

In accordance with the present invention, a structure and method of making the diaphragm in a loudspeaker transducer has economically incorporated structural features for controlling the cone's resonant behaviors such that there is no longer a single strong resonant mode. By dispersing the modes, there are many weak modes as opposed to only one or few strong modes. Strong modes cause greater frequency response deviations than weak modes, and many weak modes are superior to a few strong ones.

The loudspeaker transducer cone of the present invention has specially contoured protrusions that extend from the main surface to provide stiffening and a break-up of resonant vibration modes. The protrusions are convex on one surface and concave on the opposite, so their average thickness is similar to the flat areas of the cone (i.e., they are shell-like in nature rather than solid). These protrusions are generally curved as they run from the inside to the outside to encourage modal break-up (suppressing strong vibrational modes). The curved distally or forwardly projecting protrusions resemble an array of turbine blade shapes, so a preferred embodiment of the diaphragm is referred to as the "turbine cone" and the diaphragm preferably has a laminated or multi-layer foam core structure molded in the turbine geometry to provide a diaphragm with dramatically increased stiffness and damping, without adding unwanted mass.

By using distally or forwardly projecting protrusions that extend forwardly beyond the frustoconical cone surface, the body of the cone is made stiffer. Curving the turbine pattern protrusions provides a modal break-up by partially eliminating the consistent path lengths that can lead to strong vibrational modes. The cone's protrusions are preferably molded into the cone body to provide a unitary structure taking the shape of bumps, shells, or channels which are typically rounded and curved. They are convex on one side (preferably the front surface) and concave on the other (back surface), meaning that they are approximately the same thickness as the main body of the cone, and not generally solid.\

It is well known that a shell with even a small amount of curvature is considerably stiffer than a similarly sized flat plate. This principle is applied to cones via the introduction of the protrusions roughly in the middle of the cone. These protrusions provide additional stiffness to the cone, pushing modes to higher frequencies (i.e., beyond the passband of the signal provided to the transducer from the host loudspeaker system). Alternately, the protrusions can be more channel-like, in that they are much longer than they are wide, so that each protrusion behaves more as a stiffening rib.

Curving the protrusions has the effect of "disrupting" the surface of the cone. This disruption minimizes the number of different paths that a vibrational mode can develop on that are of nearly the same length. As modal frequency is a function of the path length, having many different path lengths means that there will be a large range of modes developing, but none of them will be strong. This means that there will be many weak modes created rather than a few strong ones.

The direction of the curving can vary (e.g., clockwise or counter-clockwise are likely to be equally effective), and mixing the directions may provide performance benefits by providing additional modal break-up. The sizes of the protrusions also do not need to match and mixed sizes may also be beneficial in providing additional modal break-up.

The benefit of the protrusions can be seen in comparisons with the measured acoustic frequency response of a transducer with a traditional cone, which is not as smooth as that for an otherwise identical transducer with a cone that has the broad raised curved protrusions of the present invention, particularly in the higher frequency region.

The above and still further objects, features and advantages of the present invention will become apparent upon consideration of the following detailed description of a specific embodiment thereof, particularly when taken in conjunction with the accompanying drawings, wherein like reference numerals in the various figures are utilized to designate like components.

DESCRIPTION OF THE FIGURES

FIGS. 3A, 3B and 3C are front, top and side views, in elevation, of another embodiment of the reinforced loudspeaker diaphragm of the present invention illustrating distally projecting evenly spaced arrays of curved narrow grooves or channels, in accordance with the structure and method of the present invention.

DESCRIPTION OF THE PREFERRED EMBODIMENT

Figure 1A:
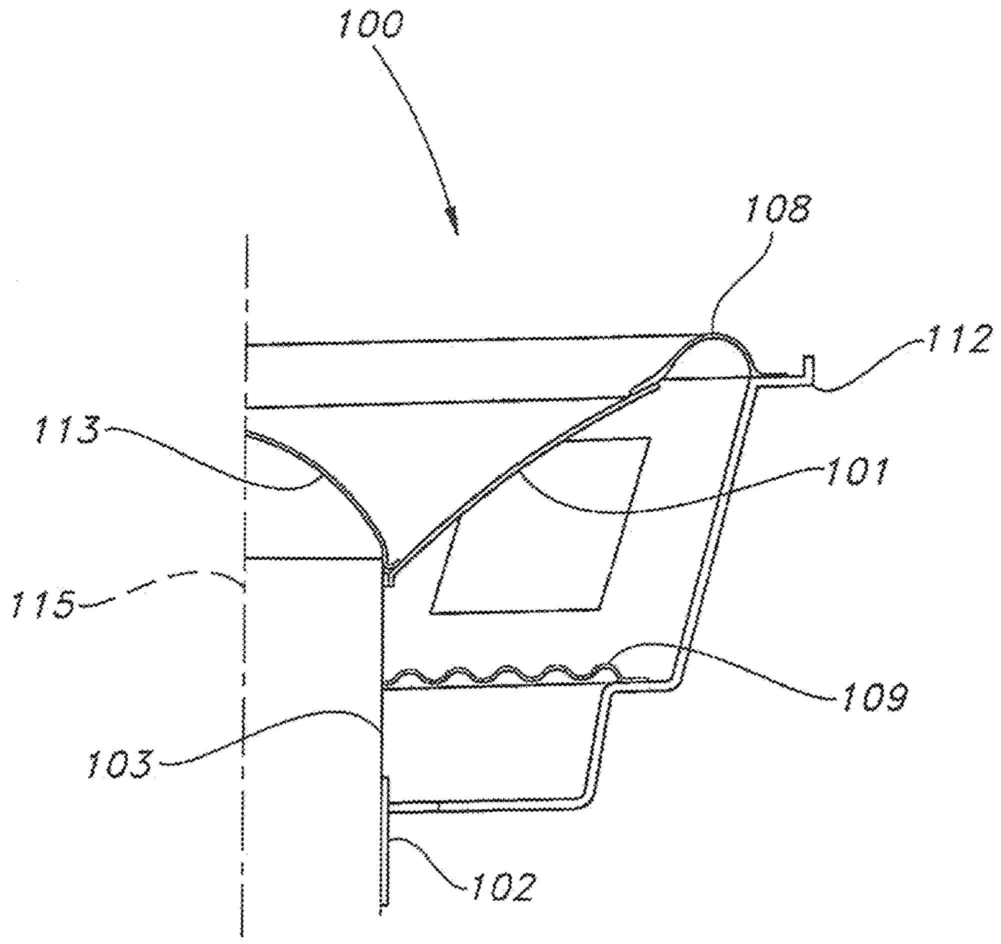
(PRIOR ART) FIG. 1A
FIG. 1A is a cross sectional view, in elevation, illustrating a traditional loudspeaker driver with a frusto-conical diaphragm, in accordance with the prior art.

Referring next to the illustrations of FIGS. 2A-2E an exemplary embodiment of an electrodynamic loudspeaker or transducer is shown (e.g., similar to 100, but with an improved diaphragm or cone). Improved transducer or cone 201 is symmetrical about central axis 215 (meaning, as in FIG. 1A, cone 201 may be incorporated into a driver motor structure as shown in FIG. 1A).

Referring to FIGS. 2A-2E, in a first exemplary embodiment, the improved loudspeaker driver of the present invention has an improved diaphragm or cone 201 with, preferably, seven (7) economically incorporated structural features 210 molded in-situ for controlling the cone's resonant behaviors such that there is no longer a single strong resonant mode. By dispersing the modes, there are many weak modes as opposed to a one or few strong modes (compare, e.g., FIG. 1B to FIG. 5). Strong modes (as shown generally at 155 in FIG. 1B) cause greater undesired deviations than weak modes, and many weak modes (as shown generally at 255 in FIG. 5) are superior to a few strong ones.

The exemplary loudspeaker transducer cone 201 illustrated in FIGS. 2A-2E is generally frustoconical and terminates proximally in a central opening 204 which is configured to receive a voice coil former (e.g., 103). The cone 201 terminates forwardly or distally in an outer peripheral edge which projects radially out from and symmetrically about central axis 215 to provide a distal annular or circular surface carrying suspension 208 and has seven specially contoured turbine-blade or petal shaped protrusions 210 that extend or project distally from the main surface 230 to provide stiffening and a break-up of resonant vibration modes. The protrusions 210 are convex on the distal or front facing surface and concave on the opposite proximal or rear facing surface, so their average thickness (e.g., 0.5 mm) is similar to the frusto-conical areas of the cone (i.e., meaning the projecting petals or protrusions 210 are shell-like in nature rather than thicker solid features (which would add undesirable mass).

These protrusions 210 are generally radially arrayed and curved as they run from the central opening 204 inside to the outer edge to encourage modal break-up (suppressing strong vibrational modes). The curved distally projecting protrusions 210 resemble an array of turbine blade shapes, so the preferred embodiment of the diaphragm or cone 201 is referred to as the "turbine cone" (e.g., as shown in the photograph of FIG. 2B) and the diaphragm preferably has a foam core structure (e.g., as shown in cross section in FIG. 2C) molded in the turbine geometry to provide a diaphragm with dramatically increased stiffness and damping, without adding unwanted mass. Preferably, as shown in FIGS. 2A-2E, diaphragm or cone (e.g., 201) includes an array of seven (7) evenly spaced distally projecting turbine blade or flower petal shaped convex protuberances 210 which project distally from the cone's substantially frustoconical front surface 230 by a protrusion projection distance 240 (e.g., approx. 3 mm) which is greater than the cone's thickness (e.g., 0.5 mm).

Figure 1B:
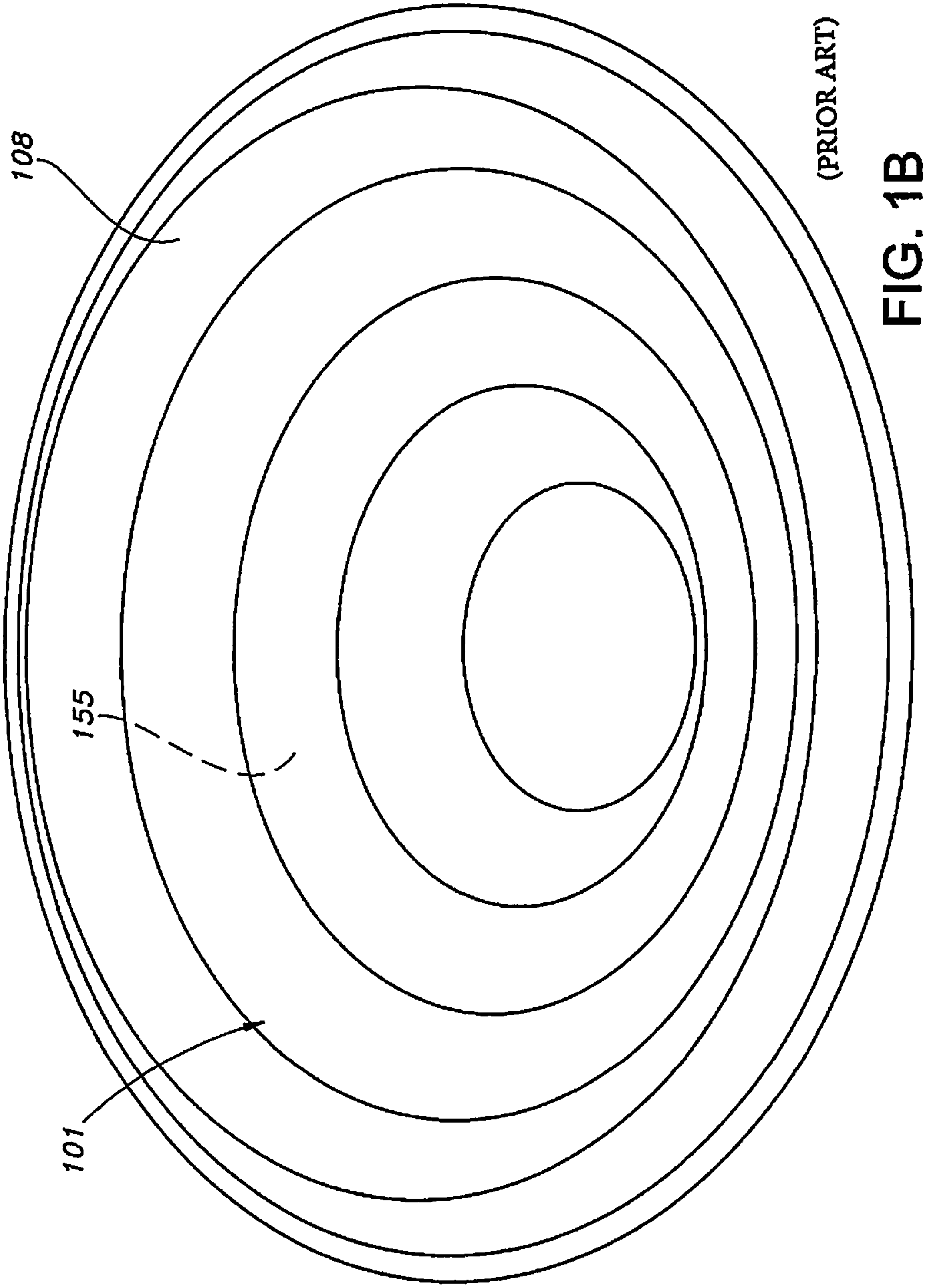
FIG. 1B (PRIOR ART)
FIG. 1B is a perspective view illustrating an undesirable behavior of the diaphragm of FIG. 1A during operation, and showing "cone break-up" which occurs when the cone body behaves non-pistonically and starts flexing and bending (instead of all portions moving axially in the same direction at the same time), in accordance with the prior art.
Figure 2A:
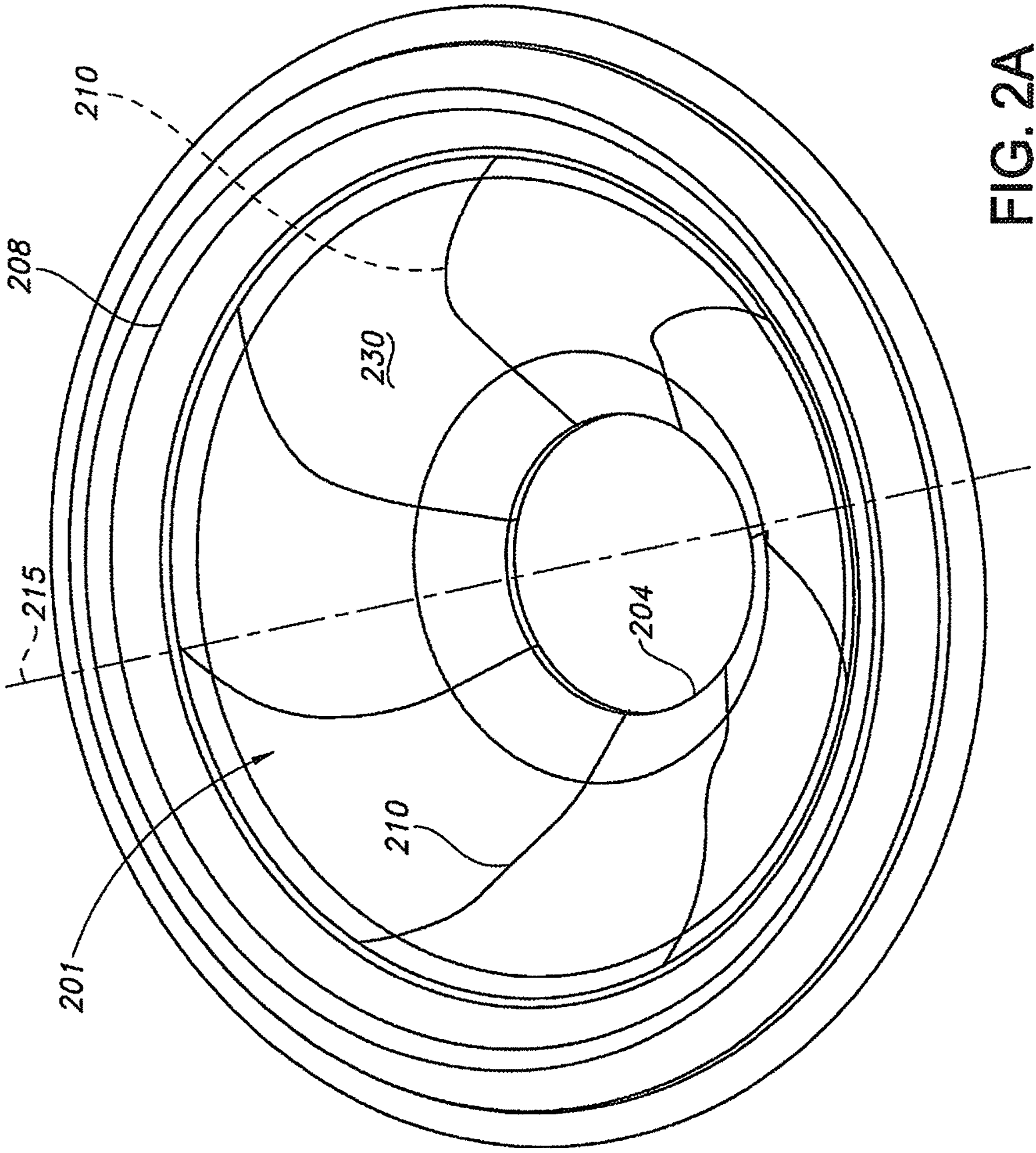
FIG. 2A is a perspective view, in elevation, of a loudspeaker transducer cone with specially contoured protrusions that extend from the main surface to provide stiffening and a break-up of the undesired resonant vibration modes. The protrusions are convex on the front or distal surface and concave on the proximal or rear surface, so their average thickness is similar to the flat areas of the cone. These protrusions are generally curved as they run from the central opening to the outer peripheral edge to enhance resonant modal break-up (suppressing strong vibrational modes), in accordance with the structure and method of the present invention.
Figure 2B:
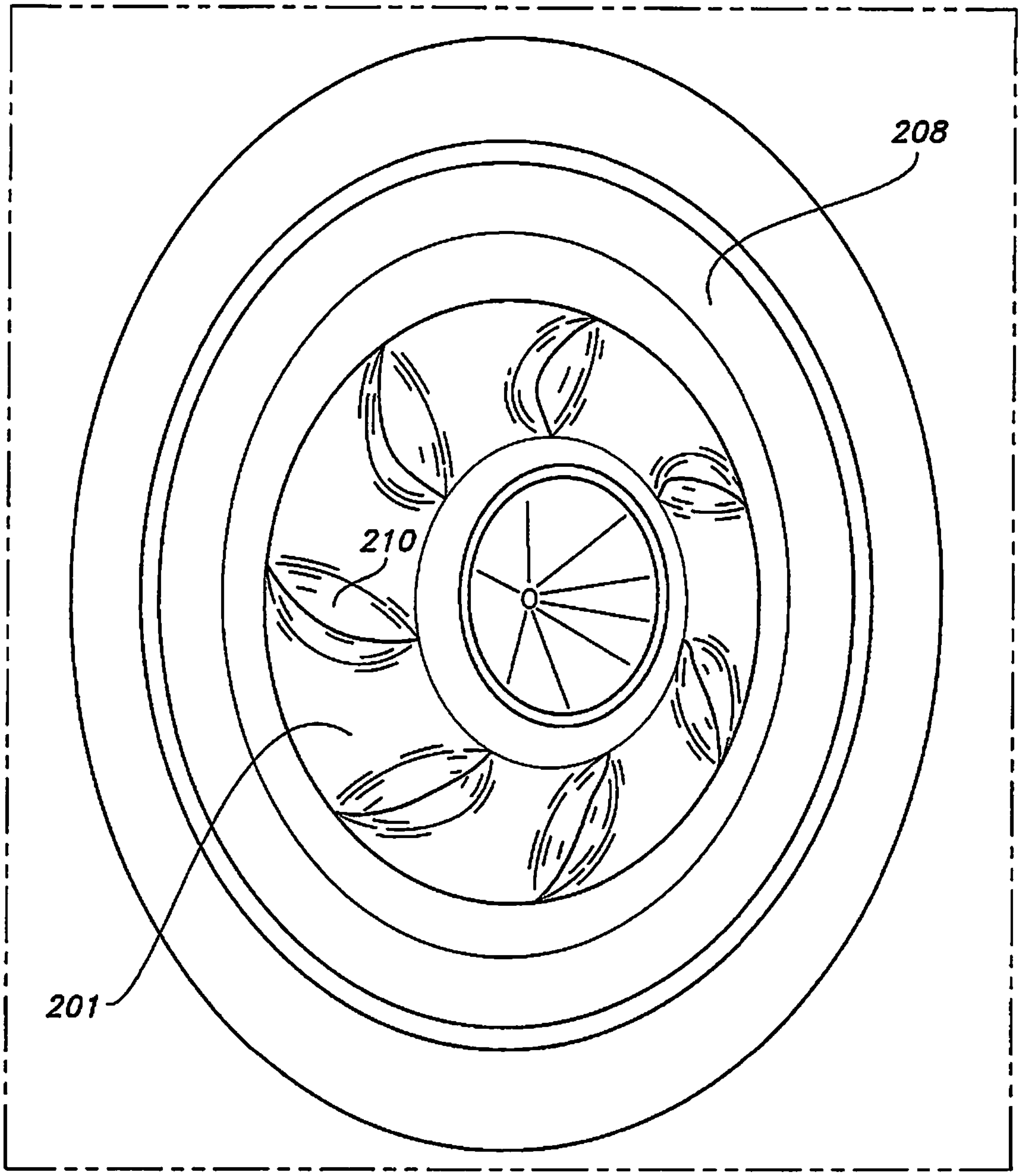
FIG. 2B is a photograph of a preferred embodiment of the driver of FIG. 2A, as installed in a full range loudspeaker system, in accordance with the structure and method of the present invention.
Figure 2C:
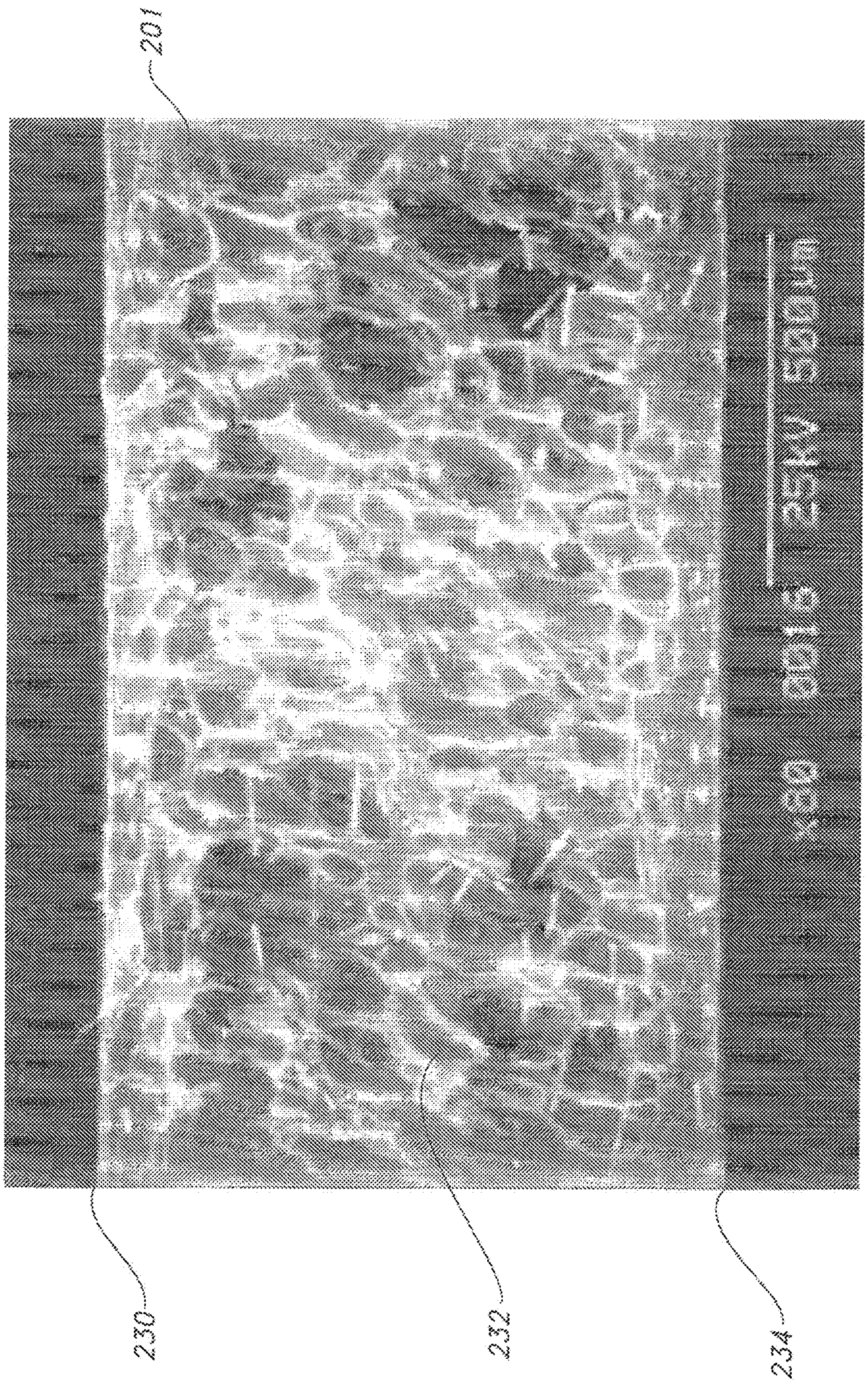
FIG. 2C is magnified cross section view of the diaphragm foam core for the loudspeaker diaphragm of FIGS. 2A and 2B, in accordance with the structure and method of the present invention.
Figure 2D:
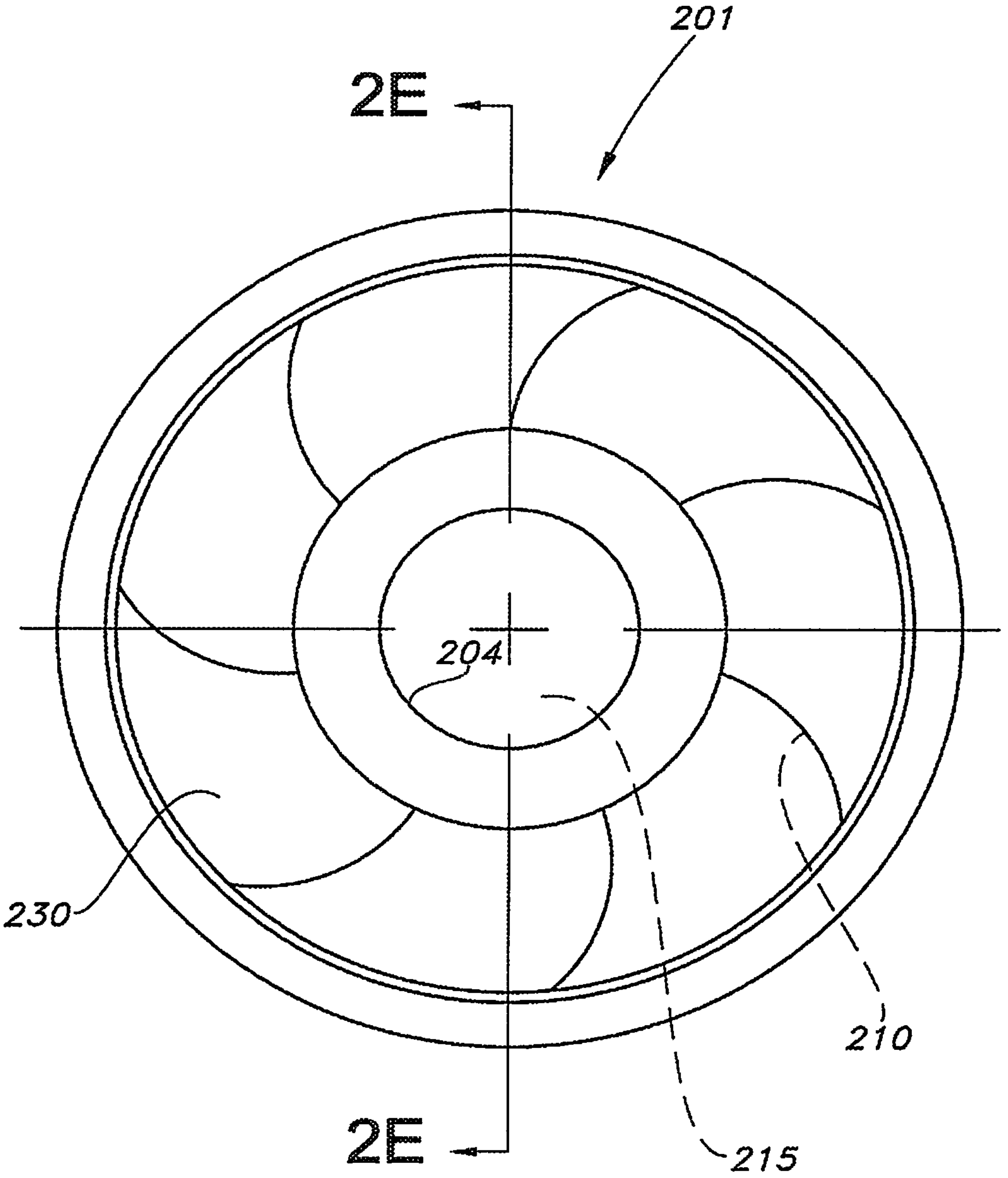
FIG. 2D is a front or proximal side view, in elevation, of the cone or diaphragm surface for the loudspeaker diaphragm of FIGS. 2A, 2B and 2C showing curved traces defining spaced centers about which are defined the contoured protrusions that run from the central opening to the outer periphery, in accordance with the structure and method of the present invention.
Figure 2E:
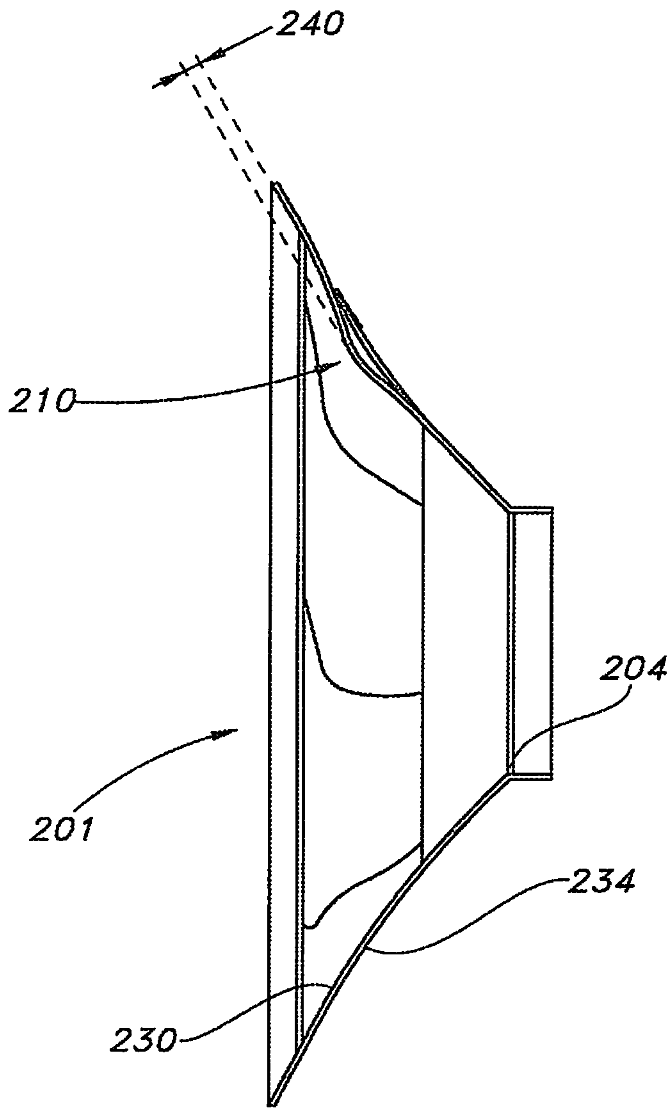
FIG. 2E is a cross sectional view, in elevation, taken along the line A-A in FIG. 2D and illustrating one of the contoured protrusions that run from the central opening to the outer periphery, in accordance with the structure and method of the present invention.

In accordance with the method of the present invention protrusions 210 are molded from a polymer resin or foaming agent (e.g., polypropylene) by depositing a selected quantity of the foaming agent into an open mold, and then closing the mold and applying a selected amount of pressure at a selected pressure to cause the foaming agent to cure in the mold and, once cured, provide solid non-porous front and back cone surfaces or solid skins (230, 234) which encapsulate the foam core structure 232 (e.g., as illustrated in the microscopic photograph of FIG. 2C). The difference in density and stiffness between the solid skins 230, 234 and the foam core 232 increase the cross sectional stiffness of the cone (because of the increase in cross sectional thickness) and increase internal damping due to shear between the stiff skins and soft foam core 232. The cone body 201 and its protrusions 210 are molded together with the protrusions 210 bulging or extending distally from the cone's distal or front surface 230 by a magnitude that is significantly greater than the cone thickness (e.g., 0.5 mm, as shown in FIGS. 2B and 2E). The cone body 201 and its protrusions 210 are molded together in-situ, whereby the body of the cone is made lighter and stiffer. Curving protrusions 210 cause the desired modal break-up by partially eliminating the consistent path lengths that can lead to strong vibrational modes (e.g., as shown in FIG. 1B).

The cone's protrusions (e.g., 210) are preferably molded into the cone body in an equally spaced radial array to provide a unitary structure taking the shape of bumps, shells, or channels which are preferably rounded and curved, convex on one side and concave on the other, meaning that they are approximately the same thickness as the main body of the cone, and not generally defined as solid distal projections. The protrusions' curvature provides a cone surface which is considerably stiffer and more resistant to a bending moment than a similarly sized flat cone surface. The protrusions 210 prevent "oil-can" bending modes and provide additional stiffness to the cone, pushing modes to higher frequencies (i.e., beyond the passband of the transducer).

FIG. 2B is a photograph of a preferred embodiment of a driver made with the diaphragm 201 illustrated in FIG. 2A, installed in a full range loudspeaker system, in accordance with the structure and method of the present invention. FIG. 2C is magnified cross section view of the 0.5 mm thick diaphragm illustrating the foam core for the loudspeaker diaphragm of FIGS. 2A and 2B. And FIG. 2D is a front or proximal side view, in elevation, of the cone or diaphragm surface for loudspeaker diaphragm 201 of FIGS. 2A, 2B and 2C showing the seven equally spaced curvilinear radial traces defining spaced centers about which are defined the seven contoured turbine or petal shaped protrusions 210 that run from the central opening 204 to the outer periphery of the diaphragm. FIG. 2E is a cross sectional view, in elevation, taken along the line A-A in FIG. 2D and illustrating, above the central opening, one of the forwardly or distally bulging contoured protrusions that run from central opening 204 to the outer periphery, in accordance with the structure and method of the present invention.

Alternately, another embodiment of the diaphragm or cone 301 has protrusions 310 that are more channel-like in that they are much longer than they are wide (see, e.g., FIGS. 3A, 3B and 3C) where seven equally spaced channel like protrusions 310 define radially arrayed curvilinear stiffening ribs 310. The alternative exemplary loudspeaker transducer cone 301 illustrated in FIGS. 3A-3C is also generally frustoconical and terminates proximally in central opening 304. The cone 301 terminates distally in an outer peripheral edge which is defined symmetrically around central axis 315 and projects forwardly or distally to provide a distal annular or circular surface carrying a suspension 308. The specially contoured protrusions 310 extend or project distally from the main cone surface to provide stiffening and the desired break-up of the undesired resonant vibration modes which would otherwise occur (as shown in FIG. 1B). The protrusions 310 are preferably cylindrically convex on the distal or front facing surface and concave on the opposite proximal or rear facing surface, so their average thickness (e.g., 0.5 mm) is also similar to the flat areas of the cone (i.e., they are tube-like in nature rather than solid). These protrusions 310 are also generally curved as they run from the central area near opening 304 (inside) to the outer peripheral edge to encourage modal break-up (suppressing strong vibrational modes).

Figure 4:
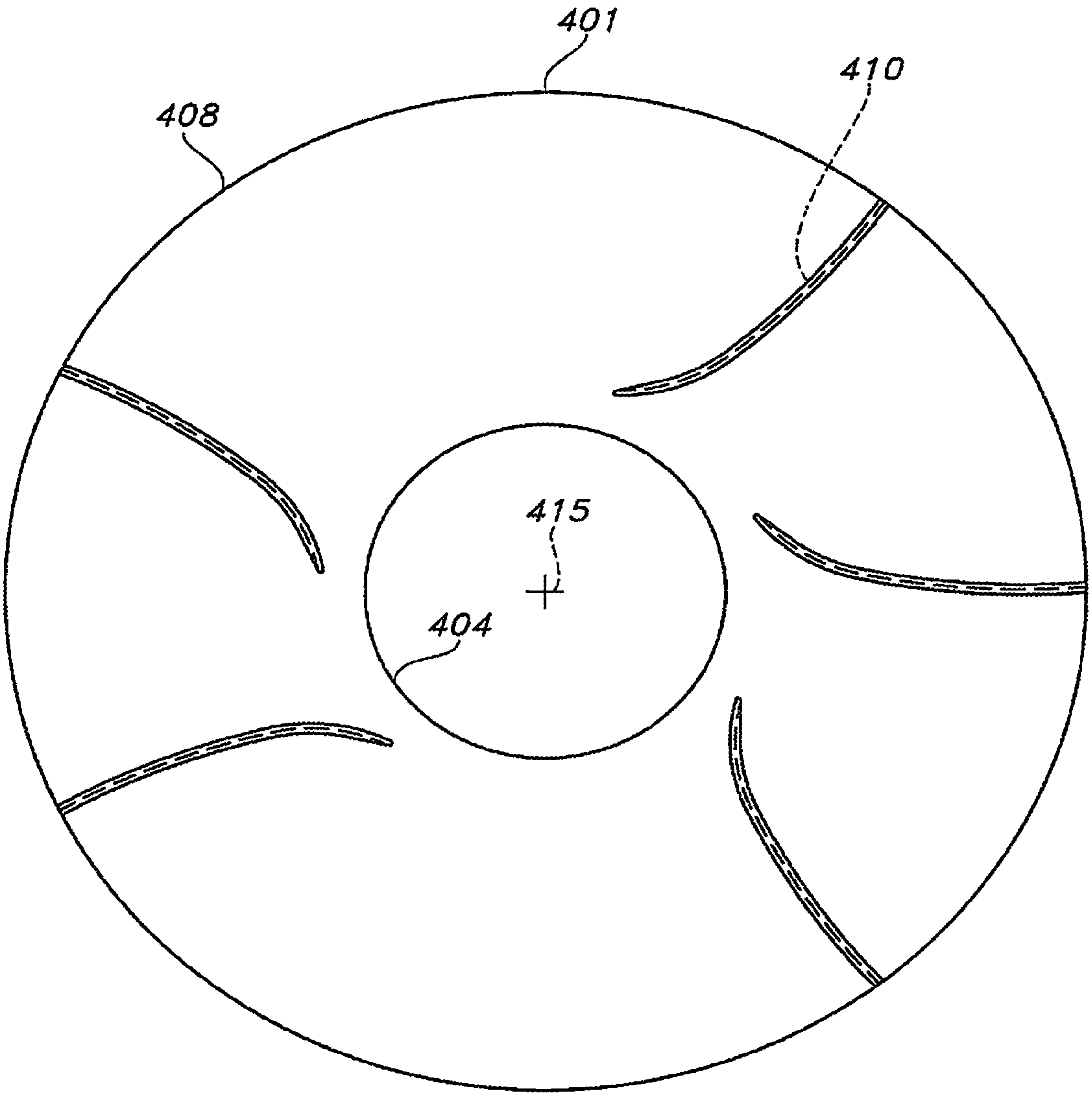
FIG. 4 is a front or proximal surface view, in elevation, of another embodiment of the reinforced loudspeaker diaphragm of the present invention illustrating distally projecting un-evenly spaced curved narrow grooves or channels, in accordance with the structure and method of the present invention.

Yet another embodiment of the present invention provides a diaphragm or cone 401 with un-evenly spaced curvilinear radial protrusions 410 which are also more channel-like in that they are much longer than they are wide (see, e.g., FIG. 4) where channel like protrusions 410 also behave as unevenly spaced curved stiffening ribs. The alternative exemplary loudspeaker transducer cone 401 illustrated in FIG. 4 is also generally frustoconical and terminates proximally in central opening 404. The cone 401 terminates distally in an outer peripheral edge 408 which projects along central axis 415 to provide a distal annular or circular surface and has specially contoured protrusions 410 that extend or project distally from the main surface to provide stiffening and a break-up of resonant vibration modes. The protrusions 410 are preferably cylindrically convex on the distal or front facing surface and concave on the opposite proximal or rear facing surface, so their average thickness is also similar to the flat areas of the cone (i.e., they are tube-like in nature rather than solid). These protrusions 410 are also generally curved as they run from the central area near opening 404 (inside) to the outer peripheral edge to encourage modal break-up (suppressing strong vibrational modes).

Figure 5:
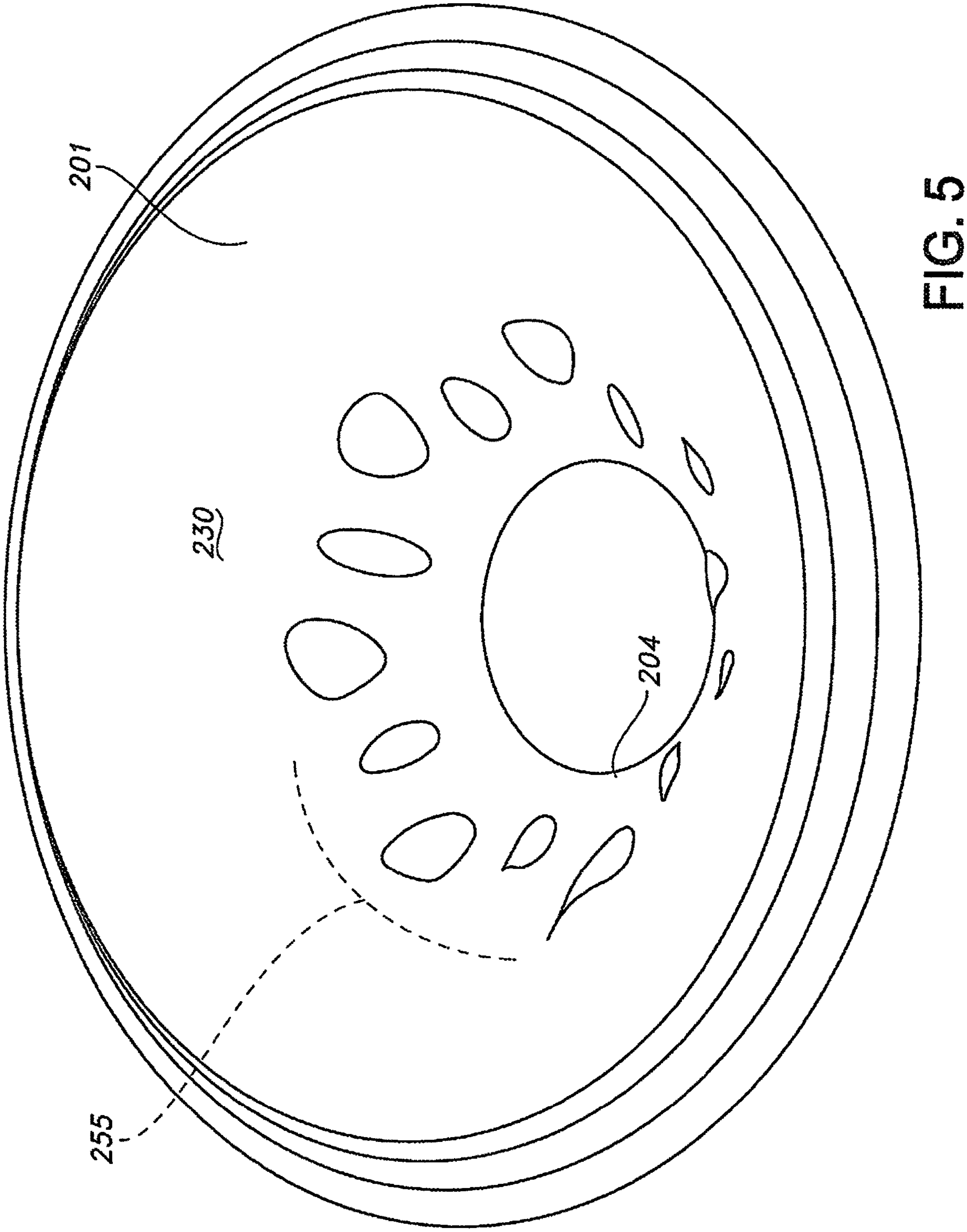
FIG. 5 perspective view illustrating the more desirable behavior of the diaphragm of FIGS. 2A-2E during operation, and showing how the specially contoured protrusions provide stiffening and thus break-up, suppressing and diminishing the undesired strong resonant vibration modes (e.g., of FIG. 1B) whereby the cone body of the present invention behaves more nearly pistonically, with less smaller flexing and bending modes, in accordance with the structure and method of the present invention.
Figure 6:
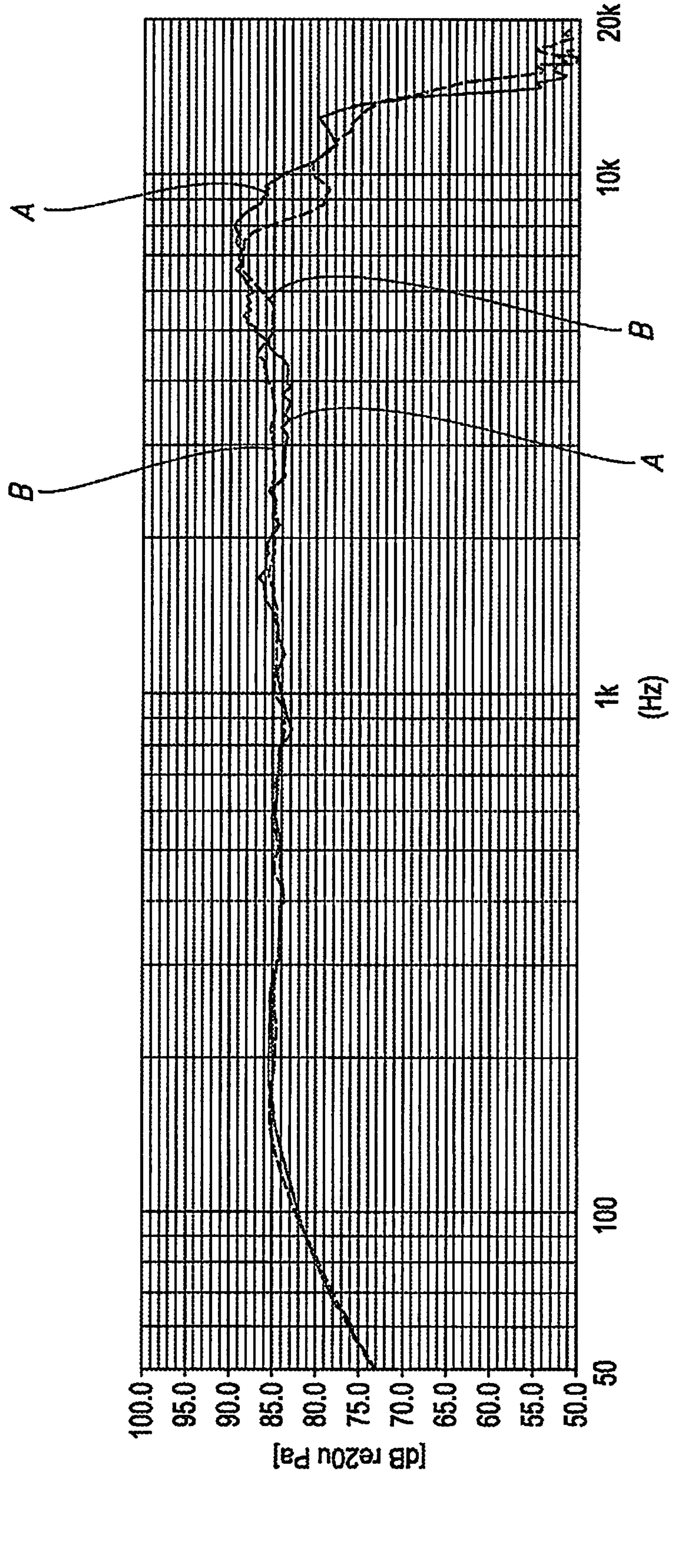
FIG. 6 is a pair of comparable frequency response plots for a first loudspeaker transducer driven in a loudspeaker system with the prior art diaphragm or cone (e.g., of FIGS. 1A and 1B) providing the less desirable response shown in dotted line A, and a second loudspeaker transducer (e.g., as illustrated in FIGS. 2A-2D and FIG. 5), showing the smoother and more desirable response in dashed line B, in accordance with the structure and method of the present invention.

Curving the protrusions (e.g., 210, 310 or 410) instead of providing stiffeners aligned along straight radial lines was observed to provide the effect of “disrupting” the path of bending mode vibrations which would otherwise travel along the surface of the cone. This disruption minimizes the number of different paths that a vibrational mode can develop on that are of nearly the same length (see, e.g., FIGS. 1B and 5, which illustrate comparable examples of the behavior of a smooth traditional cone (101) and the improved cone with protrusions (201, with protrusions 210) when driven with a drive signal having the same frequency and drive signal amplitude or level. The undesirable strong mode resonance behavior illustrated for prior art cone 101 shows large affected areas (see FIG. 1B, generally at 155) meaning a resonance strong mode is generated which causes audible undesirable problems with frequency response. By comparison, the behavior of the electrodynamic transducer of the present invention, as illustrated in FIG. 5, when driven at the same resonant frequency develops only disrupted modes over smaller areas (see FIG. 5, generally at 255) meaning no strong mode is generated and instead only smaller areas are affected by disrupted modes which causes less significant problems with the transducer’s frequency response (e.g., as illustrated in FIG. 6). In applicants’ prototype testing, it has been observed that strong modal resonances have noticeable detrimental effects on the performance by strongly emphasizing a narrow frequency region, whereas weak modal resonances only cause a very small emphasis over its frequency region, leading to a notably smoother frequency response.

As modal frequency is a function of the path length, having many different path lengths means that there will be a large range of modes developing, but none of them will be dominant or strong. This means that there will be many weak modes created (e.g., as seen in affected region 255 in FIG. 5) rather than a few strong ones (e.g., as seen in affected region 155 in FIG. 1B). The direction of the curving protrusions (e.g., 210, 310 or 410) illustrated in FIGS. 2A-5 is exemplary, but variations are possible: clockwise or counter-clockwise curvatures are equally effective, and mixing the directions between adjacent protrusions (not shown) is believed likely to provide performance benefits by providing additional modal break-up. The sizes of the protrusions (e.g., 210, 310 or 410) also do not need to match and mixed sizes would also likely be beneficial in providing additional modal break-up.

The audibly perceived and measured benefit of the improved diaphragm (e.g., 201) includes smoother acoustic frequency response, as can be seen in FIG. 6, where the data plotted in curve A (dotted trace) show a frequency response of an unimproved transducer with a traditional cone (e.g., 101), while data plotted in curve B (dashed trace) show an otherwise identical transducer with an improved, resonance mode diminishing cone (e.g., 201, 301 or 401). The plotted data for curve B is notably smoother, particularly in the more critical portion of the driver’s frequency range of operation (e.g., from a few hundred Hz to over 5 KHz). More particularly, FIG. 6 illustrates, for an exemplary embodiment of the 5.25 inch petal cone driver of FIGS. 2A-2E, whose measured acoustic frequency response is compared to an otherwise identical but conventional transducer, the driver structure and method of the present invention provides notably smoother, flatter acoustic response through the operating passband of the transducer. In particular, over the nearly three-octave wide 800 Hz-5.0 kHz range, a passband critical to midrange reproduction for any high performance audio system, improvements of 3.0 dB in broadband response are achieved.

The cone or diaphragm (e.g., 201, 301 or 401) of the present invention may be supported by and affixed to a cooperating resilient material suspension member (e.g., 208 or 308) fixed to a rigid supportive frame or basket that also carries a three-piece magnetic circuit (not shown), so that the frame supports the diaphragm which is pistonically movable within the frame along the central axis, when driven. FIG. 3B shows the embodiment of the cone or diaphragm supported by and affixed to the suspension member (308). FIGS. 3A and 3C illustrate the embodiment of the cone or diaphragm neither supported by nor affixed to the suspension member (308).

As noted above, the purpose of the cone or diaphragm structure (e.g., 201, 301 or 401) and method of the present invention is to provide improved performance (as compared to prior art loudspeaker 100 in FIG. 1) by providing more control over the behavior of cone body. For a preferred (prototype) embodiment, diaphragm (e.g., 201, 301 or 401) is a foam core cone made of a polypropylene material, molded in a unitary part, as described above, but may also be made from other conventional cone materials (e.g., paper, molded fibers or metal such as aluminum). The resiliently supported cone (e.g., 201, 301 or 401) may be thinner than a conventional transducer cone 101 and is supported by resilient material suspension member (e.g., 208) which preferably comprises a resilient material such a polyurethane foam or some other soft, springy resonance dampening material.

Persons of skill in the art will appreciate that the present invention provides a loudspeaker transducer including a diaphragm (e.g., 201, 301 or 401) with a plurality of symmetrically radially arrayed distally projecting protrusions (e.g., 210, 310 or 410) defined as convex surfaces or channel-like protrusions extending in evenly spaced curved arcs extending from the cone's central region to the proximity of the cone's peripheral edge. In the exemplary embodiments illustrated in FIGS. 2A-5, the cone's special protrusions (e.g., 210, 310 or 410) extend from the main surface to provide stiffening and a break-up of resonant vibration modes and are convex on one surface and concave on the opposite, so their average thickness is similar to the flat areas of the cone and generally curved as they run from the inside to the outside to encourage modal break-up (suppressing strong vibrational modes).

FIG. 5 is a perspective view showing cone 201 and front solid skin surface 230 illustrating that more desirable behavior of the diaphragm (e.g., of FIGS. 2A-2E) during operation, and showing how the specially contoured protrusions provide stiffening and thus break-up, suppressing and diminishing the undesired strong resonant vibration modes (e.g., of FIG. 1B) whereby the cone body of the present invention behaves more nearly pistonically, with less smaller flexing and bending modes, in accordance with the structure and method of the present invention. FIG. 5, like FIG. 1B, is an illustration of an instant in time, showing break-up modes on the cone surface, while FIG. 6 is a pair of comparable frequency response plots for a first loudspeaker transducer driven in a loudspeaker system with the prior art diaphragm or cone (e.g., of FIGS. 1A and 1B) providing the less desirable response shown in dotted line A, and a second loudspeaker transducer (e.g., as illustrated in FIGS. 2A-2D and FIG. 5), showing the smoother and more desirable response in dashed line B, in accordance with the structure and method of the present invention. Based on applicants' work with the prototypes illustrated in FIGS. 2A-5, it is believed that the avoidance of symmetry in the layout of the protrusions (e.g., 410) generally leads to a beneficial increase in the modal break-up by reducing the number of modes with the same frequency. One form of symmetry to be avoided is bilateral or mirror symmetry. A cone with bilateral symmetry (e.g., 101) will allow the development of similar modes on both halves of the cone, leading to stronger modal behavior than found in a cone without such symmetry. One method of achieving bilateral asymmetry in accordance with the method of the present invention is through using and odd number of protrusions (e.g., five or seven protrusions). While this does not eliminate radial symmetry, it does have the benefit of being more visually appealing than a radially asymmetric cone while offering some of the benefits.

Based on applicants' preliminary observations with the improved cone and method of the present invention, a "pistonically" stiffer cone is provided, but since the broad protrusions (e.g., 210) don't extend to the cone's edge (e.g., 208), they don't stiffen the entire cone surface at lower frequencies, and instead provide a more localized stiffening effect which in turn appears to cause the desired modal break-up and frequency response improvement. In comparison, the narrow-protrusion embodiment's channel-shaped protrusions (e.g., 310, 410) do have the protrusions extending to the outside edge of the cone (e.g., 308, 408) and so provide a more overall stiffening effect because they are effectively stiffening ridges at lower frequencies. Given that the channel-shaped protrusions (e.g., 310, 410) are hollow, or tube-like, and curved, the flex at higher frequencies and provide similar modal break-up.

Persons of skill in the art will appreciate that the present invention makes available a method wherein a loudspeaker transducer cone or diaphragm (e.g., 201, 301 or 401) is molded from a polymer (e.g., a polystyrene foaming agent) by depositing the polymer into an open (e.g., two part, clam shell like) mold assembly configured with interior mold surfaces (not shown) to mold, compress, heat (if necessary, depending on material) and thereby create a one-piece cone or diaphragm (e.g., 201) having a plurality of radially arrayed distally projecting protrusions (e.g., 210, 310 or 410) which provide convex surfaces or channel-like protrusions extending, preferably in evenly spaced curved or curvilinear arcs extending preferably from the cone's central region (e.g., 204, 304 or 404) to the proximity of the cone's peripheral edge. In the next step the mold assembly is closed to constrain, compress and cure the polymer (e.g., foaming agent) material to provide a light, stiff, one piece foam core diaphragm having non-porous proximal and distal surfaces and a substantially uniform (e.g., 0.5 mm) thickness.

In accordance with the method and structure of the present invention (e.g., as illustrated in FIGS. 2A-2E) the foam core structure 232 is a result of a molding technique whereby the mold (not shown) including in the mold halves, convex and matching concave features which together define the molded protuberances 210, is injected with molten plastic including a foaming agent. Owing to the injection pressure (tons) the foaming agent is initially incapable of producing bubbles (e.g., foam/burbujas). The mold surface is kept cool relative to the plastic by means of water flowing through strategically placed cooling tubes/channels in the body of the mold. The molten plastic against the surfaces of the mold solidifies quickly becoming solid skins (eventually becoming solid skin surfaces 230, 234). But while the core of the cone is still molten, the mold is opened slightly thus decreasing the pressure on the molten liquid and allowing foam/bubbles of gas to form in the core (232) of the cone. The process can be precisely controlled such that the thickness of the foam and the solid skins is uniform and repeatable in manufacturing. As noted above, in the one-piece molded cone body 201, the difference in density and stiffness between the solid skins 230, 234 and the foam core 232 increase the cross sectional stiffness of the cone (because of the increase in cross sectional thickness) and increase internal damping due to shear between the stiff skins and soft foam core 232.

Having described preferred embodiments of a new and improved diaphragm structure and distortion suppression method, it is believed that other modifications, variations and changes will be suggested to those skilled in the art in view of the teachings set forth herein. It is therefore to be understood that all such variations, modifications and changes are believed to fall within the scope of the present invention.

What is claimed is:

1. A diaphragm having an inner opening, a central region proximate the inner opening, and an outer peripheral edge, the diaphragm comprising:

a front skin having a front surface; a back skin have a rear surface; a foam core encapsulated within the front skin and the back skin; and a plurality of radially arrayed, distally projecting protrusions defined as convex surfaces or channel-like protrusions extending in spaced curvilinear arcs from the central region to a proximity of the outer peripheral edge;

wherein the substantially uniform cross-sectional thickness is 0.5 mm.

2. A diaphragm having an inner opening, a central region proximate the inner opening, and an outer peripheral edge, the diaphragm comprising: a front skin having a front surface; a back skin have a rear surface; a foam core encapsulated within the front skin and the back skin; and a plurality of radially arrayed, distally projecting protrusions defined as convex surfaces or channel-like protrusions extending in spaced curvilinear arcs from the central region to a proximity of the outer peripheral edge;

wherein the protrusions are present in an odd quantity to provide the diaphragm with bilateral asymmetry.

3. A diaphragm having an inner opening, a central region proximate the inner opening, and an outer peripheral edge, the diaphragm comprising:

a front skin having a front surface; a back skin have a rear surface; a foam core encapsulated within the front skin and the back skin; and a plurality of radially arrayed, distally projecting protrusions defined as convex surfaces or channel-like protrusions extending in spaced curvilinear arcs from the central region to a proximity of the outer peripheral edge;

wherein the foam core comprises a polystyrene foam and wherein the front and back skins comprise non-porous polystyrene.

4. A diaphragm having an inner opening, a central region proximate the inner opening, and an outer peripheral edge, the diaphragm comprising:

a front skin having a front surface; a back skin have a rear surface;

a foam core encapsulated within the front skin and the back skin; a plurality of radially arrayed, distally projecting protrusions defined as convex surfaces or channel-like protrusions extending in spaced curvilinear arcs from the central region to a proximity of the outer peripheral edge, wherein the diaphragm is attached to and forms part of a transducer;

wherein the protrusions are convex at the front surface of the front skin and concave at the rear surface of the back skin; and wherein the diaphragm has a substantially uniform thickness, including at the protrusions; and wherein the substantially uniform cross-sectional thickness is 0.5 mm.

5. A diaphragm having an inner opening, a central region proximate the inner opening, and an outer peripheral edge, the diaphragm comprising:

a front skin having a front surface; a back skin have a rear surface;

a foam core encapsulated within the front skin and the back skin; a plurality of radially arrayed, distally projecting protrusions defined as convex surfaces or channel-like protrusions extending in spaced curvilinear arcs from the central region to a proximity of the outer peripheral edge, wherein the diaphragm is attached to and forms part of a transducer;

wherein the protrusions have an effect of disrupting paths of bending mode vibrations which would otherwise travel along the surface of the diaphragm, and wherein the disrupted paths instead provide regions of many weak modes rather than a few strong modes, which thereby provides the transducer with smoother frequency response.

6. A diaphragm having an inner opening, a central region proximate the inner opening, and an outer peripheral edge, the diaphragm comprising:

a front skin having a front surface; a back skin have a rear surface; a foam core encapsulated within the front skin and the back skin; a plurality of radially arrayed, distally projecting protrusions defined as convex surfaces or channel-like protrusions extending in spaced curvilinear arcs from the central region to a proximity of the outer peripheral edge, wherein the diaphragm is attached to and forms part of a transducer; and wherein the diaphragm is neither supported by nor affixed to the transducer by a suspension.

* * * * *